June 17, 1969     L. BRODY ET AL     3,449,949

FORCE GAUGE

Filed Oct. 27, 1967

Lee Brody,
William H. Hill,
INVENTORS.

BY

Paul M. Coble

ATTORNEY.

United States Patent Office 3,449,949
Patented June 17, 1969

3,449,949
FORCE GAUGE
Lee Brody, Los Angeles, and William H. Hill, Carlsbad,
Calif., assignors to Hughes Aircraft Company, Culver
City, Calif., a corporation of Delaware
Filed Oct. 27, 1967, Ser. No. 678,706
Int. Cl. G01l 5/12
U.S. Cl. 73—141                    5 Claims

ABSTRACT OF THE DISCLOSURE

The disclosed force gauge comprises a body of resilient material defining a slot which divides the body into two portions each having a force receiving anvil at one end so that in response to an applied force couple the slot height is decreased. A rotational displacement indicator having a spring loaded finger sensor is attached to the lower portion of the body by means of a dovetail mounting. The finger sensor is held on a surface of the upper body portion and senses the force couple engendered displacement of the upper portion in relation to the lower portion to indicate the corresponding amount of force on an associated dial. The dovetail mounting allows longitudinal movement of the indicator relative to the slot for calibration purposes.

---

This invention relates to force measuring; more particularly it relates to a device for simply, efficiently, and inexpensively measuring the force applied between two electrodes of a welding machine.

In resistance welding it is important that a proper amount of force be applied to the parts to be welded together. Often the device which controls the force is inaccurate and needs adjustment and calibration. When welding smaller and thinner parts, it is imperative that neither too much nor too little force be applied. Too much force might deform the parts or it may allow excessive current to pass through them, thereby causing overheating.

Prior art force gauges have generally incorporated a force indicator which is actuated by a plunger-type of displacement sensor. In a typical device a spring-loaded plunger is adapted to rest on a fixed point on the lower arm of a metallic spring-like member having substantially a C shape. A dial indicator is attached to the upper arm of the C member and as the two arms are pushed together by a force couple, the plunger, by means of gears and levers, moves the pointer on the dial to indicate the magnitude of the applied force.

One of the problems associated with the aforementioned type of force gauge is that such a gauge cannot be accurately calibrated over a large percentage of its indication range since the location of the plunger on the lower arm cannot be moved toward or away from the area where the force couple is applied. Also, since the force characteristics of the C shaped spring member do not necessarily remain constant over time and usage, frequent adjustment of the gauge is necessary. Often this adjustment is substantial, depending, of course, on the age, temperature, and amount of use of the gauge. Moreover, in response to a sudden application of force, the plunger may become jammed into the dial indicator, thereby causing damage to the indicator. Another problem incident to such prior art force gauges involves the placement of the force couple. For example, if the length of the force measuring instrument is short, a small deviation in force placement would greatly affect the measured result.

Accordingly, it is an object of the present invention to provide a simple, practical and highly sensitive means for measuring force.

It is a further object of the present invention to provide a device for measuring the force between welding electrodes so that high accuracy may be obtained for such measurements.

It is yet another object of the present invention to provide a device for measuring the force between welding electrodes while insuring that the electrodes are electrically insulated from one another during the force measurement.

It is still a further object of the present invention to provide a force measuring device that employs an indication-sensor arrangement that essentially eliminates jamming of the force sensing and indicating elements.

It is also an object of the present invention to provide a force measuring device on which precise location of the force to be measured is not critical.

It is another object of the present invention to provide a force measuring device that can be easily calibrated over a large percentage of its indication range.

In accordance with the foregoing objects, a force gauge according to the present invention includes a body defining an elongated slot extending throughout a major portion of the body to divide the force gauge body into an upper body portion and a lower body portion. The lower body portion has a first anvil at one end, while the upper body portion has a second anvil which faces the first anvil. A rotational displacement type indicator has an indicator body and a finger sensor rotatably mounted on the indicator body, a dial pointer being mechanically coupled to the finger sensor such that when the finger sensor is rotationally displaced the dial pointer is moved. The upper body portion defines a cavity which accommodates at least a portion of the indicator body and also defines a sensing surface for receiving an end of the finger sensor. The indicator body contains a spring member which urges the finger sensor against the sensing surface. The indicator body and the force gauge body define co-operating surfaces for enabling movement of the indicator body parallel to the length of the slot while restricting movement of the indicator body perpendicular to the length of the slot. An attachment device secures the indicator body to the force gauge body in a desired position along the length of the slot. A force couple applied between the upper anvil and the lower anvil causes displacement of the upper body portion relative to the lower body portion, the resultant rotational displacement of the finger sensor causing an indication of the magnitude of the applied force couple to be provided on the indicator.

The exact nature, as well as other objects, advantages and characteristic features of the present invention will become more fully apparent from the following detailed description of a preferred embodiment of the invention when considered in conjunction with the accompanying drawings, in which.

Figure 1:
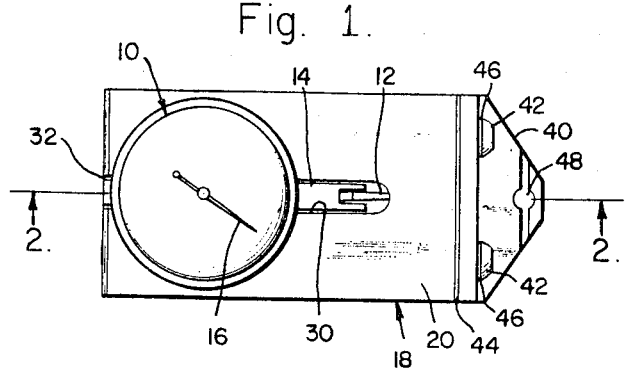
FIG. 1 is a plan view illustrating a force guage according to the invention.
Figure 2:
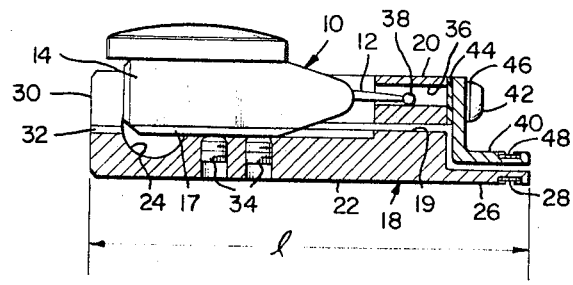
FIG. 2 is a cross-sectional view taken along line 2—2 of FIG. 1.
Figure 3:
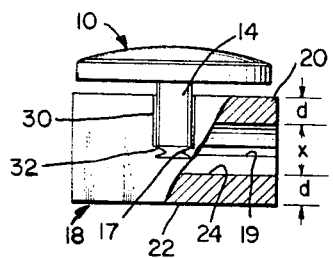
FIG. 3 is an end view of the force gauge illustrated in FIGS. 1 and 2.

Referring to the figures with greater particularity, there is shown an indicator arrangement 10 of relatively standard construction having a rotational displacement finger sensor 12, a body 14, and a dial pointer 16. The indicator body 14 is mounted in a cavity 30 in a force gauge body 18.

The force gauge body 18 defines an elongated deflection slot 19 which extends from one end of the force gauge body 18 throughout a major portion of the remainder of the body 18 to divide the body 18 into an upper body portion 20 and a lower body portion 22.

The inner end of the slot 19 is provided with a cylindrical enlarged portion 24. The function of body 18 including slot 19 and its enlarged portion 24 is to allow deflection of the upper and lower body portions 20 and 22 in response to an applied force couple, for example from two welding electrodes. The end of the lower body portion 22 remote from enlarged slot portion 24 is provided with a lower anvil portion 26 which has a force receiving area 28. Upper body portion 20 defines a highly finished tubular aperture 36 axially disposed parallel to the length of the slot 19, the lower surface of the aperture 36 receiving an end 38 of the finger sensor 12.

Finger sensor 12 is rotatably mounted at one end of the indicator body 14 so that its axis of rotation is substantially parallel to the plane of slot 19 and parallel to the major axis of cylindrical slot portion 24. When the portion 38 of finger sensor 12 is displaced from its rest position, gears and levers (not shown) in the indicator body 14 are engaged such that dial pointer 16 is rotated. A spring (not shown) in the indicator body 14 engages finger 12 such that its end portion 38 remains in contact with the lower surface of aperture 36.

The lower part of each longitudinal side surface of the indicator body 14 defines a dovetail groove 17, while the lower longitudinal side portions of cavity 30 in the force gauge body 18 define a dovetail mounting surface 32 complementary to the dovetail grooves 17. Thus, indicator body 14 is able to move parallel to the length of the deflection slot 19, while movement of the indicator body 14 perpendicular to the length of the slot 19 is restricted. A pair of calibration screws 34 disposed in the lower portion 22 of the force gauge body 18 are adapted to secure the indicator body 14 in a desired position along the length of the slot 19 suitable for the desired force measuring operation.

An upper anvil 40 is attached to the upper body portion 20 of the body 18, for example, by means of button head screws 42, at its end adjacent the lower anvil portion 26. In order to provide for electrical insulation between the two force applying elements, an insulative strip 44 is disposed between the upper anvil 40 and the upper body portion 20, for example, while insulative shoulder washers 46 are located between the button head screws 42 and the upper anvil 40. The upper anvil 40 also defines a force applying area 48 which may have an inlaid portion that absorbs some of the impact of a force applying member such as an electrode. The inlaid portion 48 may be of a ceramic material or fiber glass, for example.

The force gauge body 18 may be made of a variety of resilient materials. An example of a desirable material for small amounts of applied force is aluminum alloy. The dimensions of the force gauge body 18 will vary according to the alloy used and according to the force indication range desired. The actual dimensions of the force gauge body are significant for they are a major factor in determining the amount of physical deflection for a given amount of force applied to the force gauge across areas 28 and 48. The most critical dimension is the dimension from the enlargement 24 to the surface of the force gauge body 18; this dimension is designated as dimension $d$. At dimension $d$, the cross-section of the body 18 is the smallest, therefore that region will undergo the maximum amount of stress when the force gauge is deflected. For example, using 6061-T651 aluminum alloy as the material for the force gauge body 18, for a force gauge range of 0 to 20 pounds, dimension $d$ may be approximately $1.38 \pm 0.002$ inches. The length of the entire force gauge body 18, dimension $l$, would be approximately $3^{19}/_{32}$ inches. The diameter of enlarged slot portion 24, dimension $x$, would be approximately 0.474 inch. For a 0 to 10 pound force range, the dimension $d$ would be approximately $0.1095 \pm 0.0015$ inch; and the diameter $x$ of the enlarged slot portion 24 (which would, of course, in this case be larger) would be approximately 0.531 inch.

In its operation, the force gauge according to the invention receives a force couple across substantially the two opposing areas 28 and 48. As force is applied to areas 28 and 48, the upper and lower portions 20 and 22, respectively, of the force gauge body 18 are forced together and the height of the slot 19 is decreased. This results in a downward movement of the lower surface of the tubular aperture 36 on which finger 12 is held. The finger 12 is thus urged downward by its spring loading in accordance with the downward displacement of the upper body portion 20. The resultant rotational displacement of the finger 12 is indicated by a corresponding movement of the pointer 16 on the calibrated dial. Because of the insulating strip 44 and shoulder washers 46, a minimum amount of electrical power enters the force gauge itself.

When calibrating the force gauge, the calibration screws 34 are loosened and the indicator body 14 is moved backward or forward along the track provided by the dovetail mounting surfaces 32 and 17 until the desired calibration reading is achieved. Since the end 38 of finger 12 is in continuous contact with the lower surface of aperture 36, the amount of rotational displacement of finger 12 is either increased or decreased (depending on which direction indicator body 14 is moved) for a given force applied at areas 48 and 28 as the indicator body 14 is moved along the track provided by the dovetail mounting 17 and 32. Thus, highly accurate calibration can be achieved.

By using a finger-type indicator and the configuration as described above, an accuracy of approximately one percent over the entire range of the force gauge is insured. Moreover, the bottom surface of the force gauge can lie flush against a table, which may be the lower electrode of a welding machine, or may be an insulative support for workpieces being welded by two upper electrodes both exerting force on the upper anvil, and thereby afford a minimum separation between the force applying members. Also, since the end 38 of finger 12 is urged against and follows the movement of the lower surface of the tubular aperture 36 during a force measuring operation, the possibility of jamming due to a suddenly applied force, such as that which might result from a compressed air driven electrode, is substantially eliminated. The relatively large distance between the flexing point (which is located substantially in the vicinity of dimension $d$) and the force application points, i.e., areas 28 and 48, minimizes any error due to placement of the force couple on the force gauge. In addition, since the end 38 of finger 12 resides close to the force application points, good sensitivity of the force gauge for small increments of force may be realized.

A force gauge according to the invention is especially suited for yielding a direct, precise measurement of electrode forces exerted by various types of welding machines. It will be appreciated, however, that such a force gauge may be readily employed in other applications in which two members exert an opposing force couple.

What is claimed is:

1. A force gauge comprising: a force gauge body defining an elongated slot extending through a major portion of said body to divide said body into an upper body portion and a lower body portion, said lower body portion having a first anvil at one end, said upper body portion having a second anvil facing said first anvil; a rotational displacement type indicator having an indicator body and having a finger sensor rotatably mounted on said indicator body and having a dial pointer mechanically coupled to said finger sensor such that when said finger sensor is rotationally displaced said dial pointer is moved; said upper body portion defining a cavity to accommodate at least a portion of said indicator body and further defining a sensing surface for receiving and end of said finger sensor; said indicator body containing a spring member which urges said finger sensor against said sensing surface; said indicator body and said force gauge body defining cooperating means for enabling movement of said indicator body parallel to the length of said slot while restricting movement of said indicator body perpendicular to the length of said slot; and attachment means for securing said indicator body to said force gauge body in a desired position along the length of said slot.

2. A force gauge according to claim 1 wherein said slot has a cylindrical portion which extends throughout a cross-section of said force gauge body, the major axis of said cylindrical portion lying parallel to the plane of the remainder of said slot and parallel to the aixs of rotation of said finger sensor.

3. A force gauge according to claim 1 wherein said cooperating means includes a dovetail surface on said indicator body and a dovetail surface on said force gauge body complementary to the dovetail surface on said indicator body, and said attachment means includes at least one fastener member disposed in said lower body portion and adapted to engage said indicator body.

4. A force gauge according to claim 1 wherein said first anvil is attached to said upper body portion with insulative material separating said first anvil and said upper body portion, and wherein said second anvil is formed as an extension of said lower body portion.

5. A force gauge comprising: a force gauge body defining an elongated slot extending through a major portion of said body to divide said body into an upper body portion and a lower body portion, said slot having a portion of substantially cylindrical cross-section at its inner end; an anvil member attached to the end of said upper body portion remote from said cylindrical slot portion and electrically insulated from said upper body portion; said lower body portion defining an anvil portion protruding from its end remote from said cylindrical slot portion, said anvil portion facing said anvil member; a rotational displacement type indicator having an indicator body defining a first dovetail surface, said displacement type indicator further having a finger sensor rotatably mounted on said indicator body about an axis substantially parallel to the major axis of said cylindrical slot portion and further having a dial pointer mechanically coupled to said finger sensor such that when said finger sensor is rotationally displaced said dial pointer is moved; said upper body portion defining a cavity to accommodate at least a portion of said indicator body, said cavity having a second dovetail surface complementary to said first dovetail surface; said upper body portion further defining an aperture having a sensing surface for receiving an end of said finger sensor; said indicator body containing a spring member which urges said finger sensor against said sensing surface; and at least one fastener member disposed in said lower body portion and adapted to engage said indicator body to retain said indicator body in a desired position along the length of said slot.

References Cited

UNITED STATES PATENTS

| 2,635,453 | 4/1953 | Gentry et al. | 73—1 |
| 3,090,227 | 5/1963 | Glerum | 73—141 |
| 3,167,953 | 2/1965 | Dillon | 73—141 |
| 3,370,458 | 2/1968 | Dillon | 73—141 |

FOREIGN PATENTS 564,197  9/1944  Great Britain.

RICHARD C. QUEISSER, *Primary Examiner.*

C. A. RUEHL, *Assistant Examiner.*